US006400385B1

(12) United States Patent
Grande et al.

(10) Patent No.: US 6,400,385 B1
(45) Date of Patent: Jun. 4, 2002

(54) MICROCHANNEL PRINT HEAD FOR ELECTROGRAPHIC PRINTER

(75) Inventors: William J. Grande, Pittsford; William Mey, Rochester; Thomas M. Stephany, Churchville; Thomas N. Tombs, Brockport, all of NY (US)

(73) Assignee: Eastman Kodak Company, Rochester, NY (US)

( * ) Notice: Subject to any disclaimer, the term of this patent is extended or adjusted under 35 U.S.C. 154(b) by 886 days.

(21) Appl. No.: 08/782,272

(22) Filed: Jan. 13, 1997

Related U.S. Application Data

(63) Continuation-in-part of application No. 08/620,655, filed on Mar. 22, 1996, now abandoned.

(51) Int. Cl.[7] ................................................ G01D 15/06

(52) U.S. Cl. ........................ 347/142; 347/151; 347/158

(58) Field of Search ................................ 347/142, 147, 347/151, 158

(56) References Cited

U.S. PATENT DOCUMENTS 4,419,679 A * 12/1983 Rutherford et al.
4,544,935 A * 10/1985 Sakai
4,777,499 A * 10/1988 Okuna et al.
4,875,060 A * 10/1989 Masuda et al.
5,008,690 A * 4/1991 Koizumi et al.
5,030,974 A * 7/1991 Tange ......................... 347/147

FOREIGN PATENT DOCUMENTS

JP 01-271259 * 10/1989
JP 04-141459 * 5/1992
JP 06-071930 * 3/1994
JP 06-297752 * 10/1994
JP 07-040581 * 2/1995
JP 07-314765 * 12/1995

* cited by examiner

*Primary Examiner*—Robert Beatty
(74) *Attorney, Agent, or Firm*—Thomas H. Close

(57) ABSTRACT

Electrographic printing apparatus for forming a toner image on a recording medium includes: a magnetic brush having a rotatable magnetic core and a stationary outer cylindrical shell; a developer supply for supplying a magnetic developer powder to the magnetic brush; an array of microchannels on the outer shell for forming a plurality of parallel lines of developer in the channels; means for selectively transferring developer from the lines to a receiver; and a receiver electrode arranged in spaced relation to the array of micro-channels to define a recording region through which the receiver can be moved.

37 Claims, 7 Drawing Sheets

MICROCHANNEL PRINT HEAD FOR ELECTROGRAPHIC PRINTER

CROSS REFERENCE TO RELATED APPLICATIONS

This is a continuation-in-part of application Ser. No. 08/620,655, filed Mar. 22, 1996, entitled "MICROCHANNEL PRINT HEAD FOR ELECTROGRAPHIC PRINTER" by William Grande, et al now abandoned.

Reference is made to U.S. Ser. No. 08/294,294, filed Aug. 23, 1994, entitled "ELECTROGRAPHIC PRINTING PROCESS AND APPARATUS" by William Mey et al now abandoned.

FIELD OF THE INVENTION

The invention relates generally to the field of printing, and in particular to electrographic printing methods and apparatus.

BACKGROUND OF THE INVENTION

An electrographic printing process wherein a magnetically responsive electrically conductive toner material is deposited directly on a dielectric receiver as a result of electronic current flow from an array of magnetically permeable styli into toner chains formed at the tips of the styli as disclosed in an article entitled "Magnetic Stylus Recording" by A. R. Kotz, Journal of Applied Photographic Engineering 7:44–49 (1981).

The toner material described by Kotz is a single-component, magnetically responsive, electrically conductive toner powder, as distinguished from multiple-component carrier/toner mixtures also used in electrophotographic development systems. The magnetically permeable styli described by Kotz are a linear array of magnetically permeable wires potted in a suitable material and arranged such that the ends of the wires are perpendicular to the receiver surface. A major advantage of this system is that it operates in response to relatively low voltage control signals (of the order of 10 volts), thereby allowing direct operation from inexpensive integrated circuits.

One shortcoming of the printing process described by Kotz is that the resolution of the printing system is limited by cross talk between the styli in the print head. Another shortcoming is that the single-component magnetically conductive toners have a limited color gamut (black and brown) and therefore are not suitable for making color images. It would be desirable to make a full color printer using an electrographic printing technique.

SUMMARY OF THE INVENTION

The present invention is directed to overcoming one or more of the problems set forth above. Briefly summarized, according to one aspect of the present invention a print head for an electrographic printer of the type having a magnetic brush for transporting magnetic developer to a recording region and a receiver for receiving an imagewise pattern of a component of the developer at the recording region, includes: a substrate defining a plurality of parallel microchannels for confining the developer to flow in the microchannels; and a corresponding plurality of selectively addressable transfer electrodes located at the bottom of each microchannel for selectively transferring the component of the developer to the receiver from the microchannel.

These and other aspects, objects, features and advantages of the present invention will be more clearly understood and appreciated from a review of the following detailed description of the preferred embodiments and appended claims, and by reference to the accompanying drawings.

ADVANTAGEOUS EFFECT OF THE INVENTION

The microchannel print head of the present invention is advantageous in that it is capable of producing a high quality color image due to the excellent isolation between channels. The print head can be fabricated using a variety of well known techniques including stamping, micromachining, and photofabrication using a variety of materials.

BRIEF DESCRIPTION OF THE DRAWINGS

To facilitate understanding, identical reference numerals have been used, where possible, to designate identical elements that are common to the figures.

DETAILED DESCRIPTION OF THE INVENTION

Figure 1:
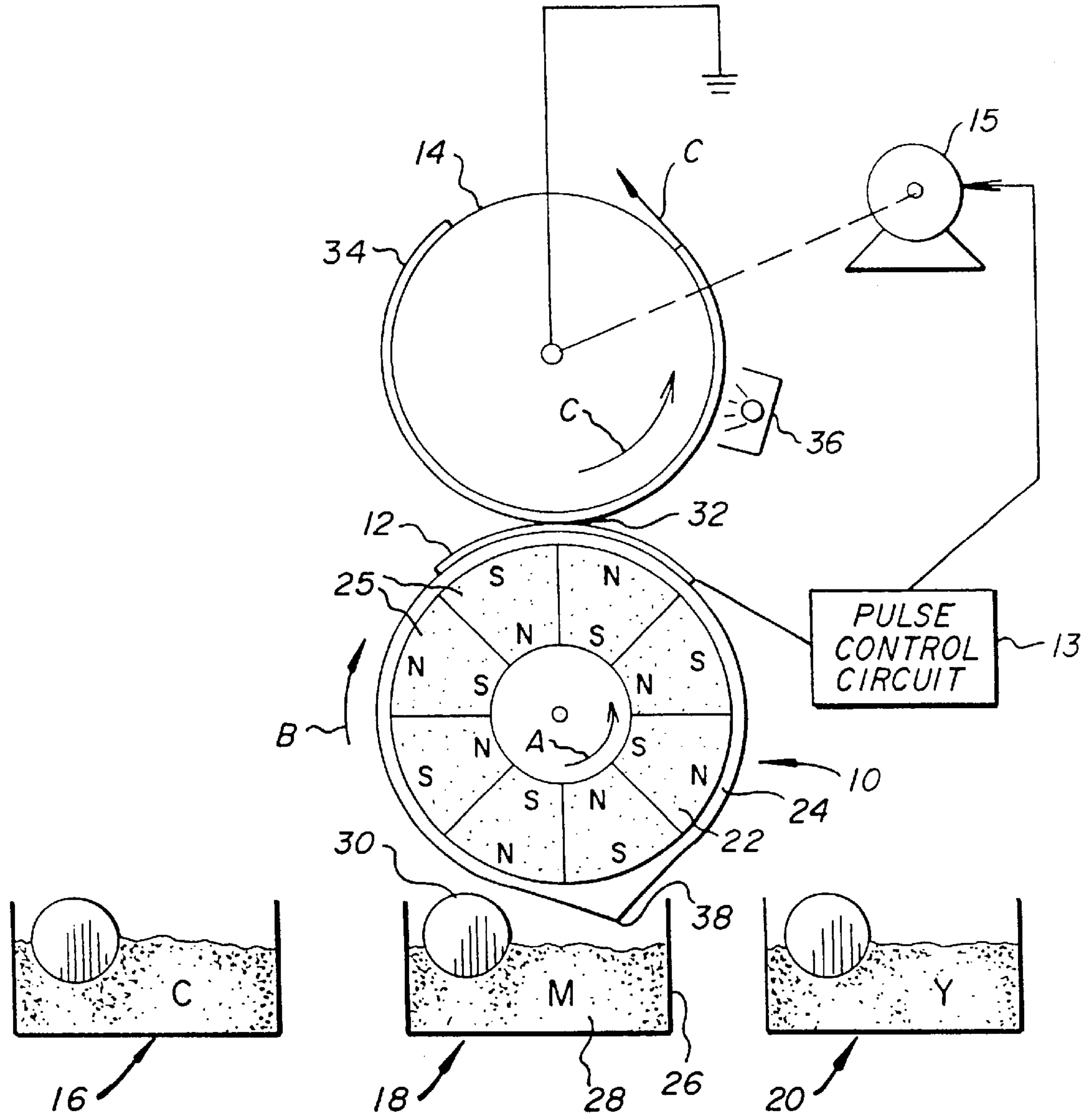
FIG. 1 is a schematic diagram of an electrographic color printer employing a microchannel print head according to the present invention.

Referring to FIG. 1, an electrographic color printer according to the present invention is shown. The printer includes a magnetic brush generally designated 10, a microchannel print head 12 driven by a pulse control circuit 13, a receiver electrode 14 driven by a stepper motor 15, and three developer supplies 16, 18 and 20 for supplying cyan, magenta and yellow developer powder to the magnetic brush 10, respectively. In a printer adapted to print text as well as color images, a fourth developer supply (not shown) for supplying black developer powder to the magnetic brush may be provided. The stepper motor 15 is powered by pulse control circuit 13 to synchronize the printing of the different colored developers.

The magnetic brush 10 includes a rotatable magnetic core 22 and stationary outer cylindrical shell 24 characterized by low magnetic permeability and high electrical conductivity. The rotatable magnetic core includes a plurality of permanent magnetic sectors 25 arranged about and extending parallel to the cylindrical surface of the shell 24 to define a cylindrical peripheral surface having alternating North and South magnetic poles. In operation, the magnetic core 22 rotates in a counter clockwise direction as indicated by arrow A to transport developer around the circumference of shell 24 in a clockwise direction as indicated by arrow B.

Each of the three developer supplies 16, 18, and 20 is constructed in a similar manner and is moveable from a position immediately adjacent the magnetic brush 10 as illustrated by supply 18, to a position away from the magnetic brush as illustrated by supplies 16 and 20 in FIG. 1. Each developer supply includes a sump 26 for containing a supply of magnetic developer 28, for example, a two component developer of the type having an electrically conductive, magnetically attractive carrier and a colored toner. A suitable developer is described in U.S. Pat. No. 4,764,445 issued Aug. 16, 1988 to Miskinis et al. The performance of the system can be optimized by employing the carrier having a balanced conductivity low enough to triboelectrically charge the toner particle, but high enough to conduct electricity. A rotatable magnetic feed roller 30 is actuable for delivering developer 28 from the sump 26 to the magnetic brush 10 in a known manner.

The microchannel print head 12 is mounted on the outer surface of shell 24 opposite receiver electrode 14 to define a recording region 32. A receiver 34, such as dielectric coated or plain paper, is wrapped around the receiver electrode 14 and moved through the recording region 32 in the direction of arrow C with one surface in contact with receiver electrode 14. Alternatively, the direction of the receiver and the flow of developer may be in opposite directions. A fusing station 36 may be provided as is known in the art to fuse the toner image to the receiver 34. The fusing station 36 may comprise for example a radiant heat source or a hot roller.

In operation, a first developer supply, say the magenta supply 18 is moved into position adjacent the magnetic brush 10. The magnetic feed roller 30 is actuated to supply developer 28 to the magnetic brush 10. The developer 28 is transported around the periphery of the magnetic brush 10 to the recording region 32, where pulses are selectively applied to an array of transfer electrodes in microchannel print head 12 by pulse control circuit 13 to transfer toner from the developer 28 to the receiver 34 in an imagewise manner as the receiver is moved by stepper motor 15 through the recording region 32. After the first color component of the image (e.g. magenta) is formed on the receiver 34, the remaining developer is removed from the magnetic brush 10.

Means are provided on the shell 24 of the magnetic brush 10 such as a lip 38 which extends a distance from the magnetic core 22 so that as the developer is transported around the periphery of the shell 24, it is moved away from the influence of the magnetic core 22 to the point where it falls back into the sump 26. Alternatively, another magnetic brush and sump (not shown) having only magnetic carrier (no toner) may be provided for cleaning. The magnetic carrier is transported around the magnetic brush to scavenge residual toner from the magnetic brush 10 and print head 12. Such an arrangement is called a magnetic brush cleaning station in the prior art.

Next, the developer supply 18 is moved away from the magnetic brush 10 and the next developer supply (e.g. the yellow developer supply 20) is moved into position to replace it. The receiver 34 is repositioned by pulse control circuit 13 and stepper motor 15 to record the yellow component of the image and insure registration between the various color components and the recording process described above is repeated. Finally, the cyan component of the full color image is recorded in a similar fashion. After the three image components are recorded, the full color image is fused to the receiver 34 at fusing station 36. In addition or alternatively, each color developer may be fused or tacked after deposition and prior to the deposition of the subsequent color.

Figure 2:
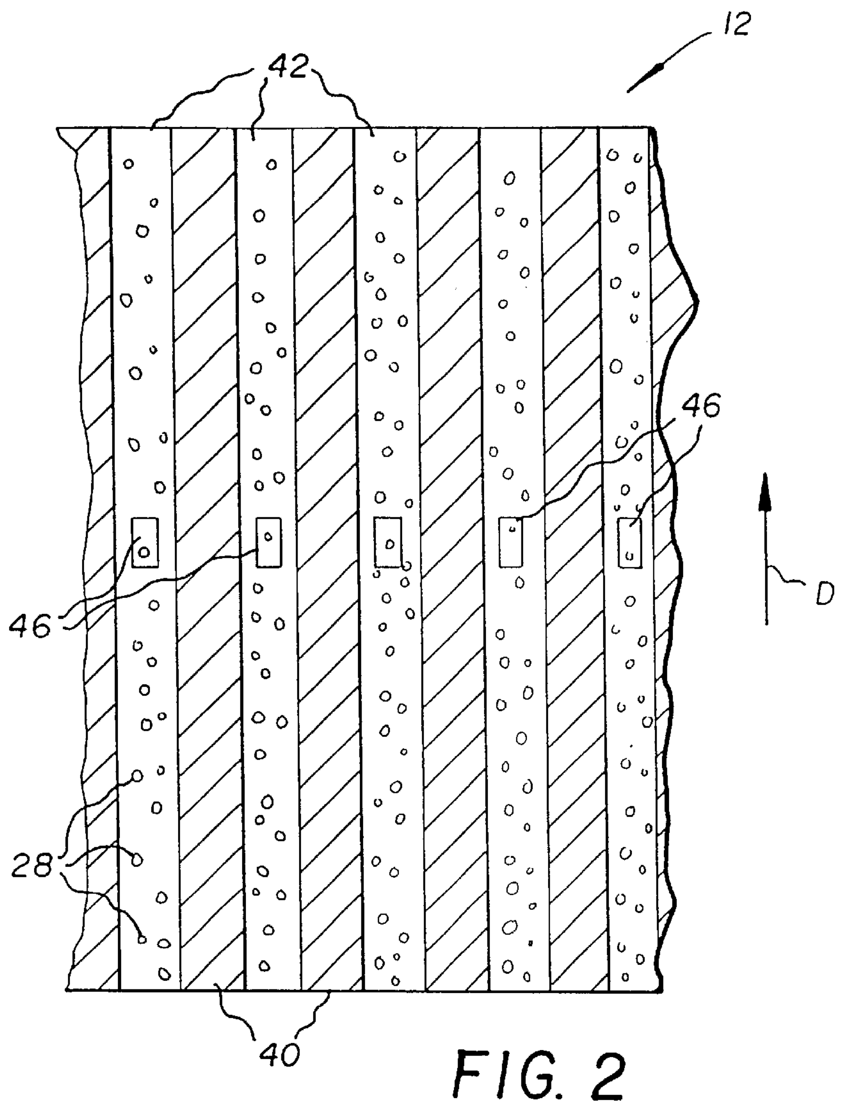
FIG. 2 is a partial top view of the microchannels in the print head of the present invention, showing the developer particles flowing in the channels.

FIG. 2 is a partial top view of the microchannel print head 12 according to the present invention. The print head 12 has a plurality of walls 40 which define a plurality of microchannels 42. Developer particles 28 are caused to travel down the microchannels in the direction of arrow D by the magnetic brush 10. An electrically conducting transfer electrode 46 is located in each of the microchannels. The microchannels can be fabricated on flex material, such as on flex circuit using photoresist to form the channels, or on non-flexible material such as silicon. The microchannel printhead can be formed, for example, by forming the transfer electrodes 46 and conductors (not shown) leading to the transfer electrodes on the surface of the nonflexible material and then applying a photo-imageable polymer to the surface of the non-flexible material and patterning the photo-imageable polymer to form the walls of the channels. The conductors leading to the transfer electrodes may be positioned under the channel walls using this technique. Alternatively, the walls may be formed in the surface by cutting, such as by using a diamond saw, or other micromachining techniques known in the art such as wet etching, dry etching, ion milling, laser ablation, and laser cutting. With this approach, the conductors leading to the transfer electrodes may be formed on the back side of the print head and electrical connection made with the transfer electrodes via plated through holes. The microchannels may be machined in any material such as that used as the stationary shell of the magnetic brush. The channel wall height is selected to accommodate the nap height of the developer chains, which depends in turn upon the particular developer and strength of the magnets in the magnetic brush, or upon the height of a leveling skive used to level the developer upon entry into the channels.

A print head according to the present invention was prepared by micromachining channels into silicon and mounting the silicon die on the stationary shell of a magnetic brush development station. A flat was machined on the cylindrical shell and the silicon die was mounted on the flat, using an adhesive. A two-component developer of the type described in the Miskinis patent noted above, having 10% by weight 10–14 um diameter insulating color toner particles mixed with 20–30 um magnetic carrier particles was applied to the shell and it was observed that the developer was transported through the channels in response to the rotating magnet core and toner was transferred to paper in response to an applied voltage of +100 to 175 volts on the transfer electrodes. The resolution was excellent with good toner density.

Microchannels have been fabricated in a silicon substrate with walls ranging from 50 microns to 200 microns. Test results indicate that the higher walls are preferred although both extremes in the range gave acceptable results. The channel length can also be adjusted over a wide range. Channel lengths in silicon and other materials as short as 6 mm and as long as 30 mm have been fabricated and test results indicate that channel lengths in this range are acceptable. The channel width depends upon the required resolution of the printer. A 300 dot per inch printer can be made using 42 micron wide channels separated by a 42 micron thick walls for a channel pitch of 84 microns.

As the magnetic developer particles 28 move along the microchannels in response to the rotating magnetic core 10, they eventually reach the transfer electrodes 46. The transfer electrodes are individually addressable and if zero volts are applied to an electrode, no toner transfer occurs. At applied voltages above ground (zero), toner is transferred to the receiver 34, in proportion to the voltage applied to the electrode 46. Preferably, the transfer electrodes 46 are formed from a non-corroding material such as gold, for example by depositing a layer of electrode material and patterning the material by liftoff techniques.

Figure 3:
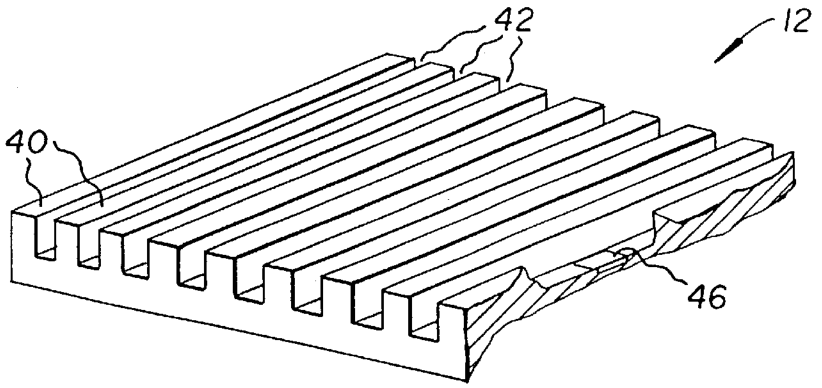
FIG. 3 is a partial perspective view of the microchannel print head.

FIG. 3 is a partial perspective view of the microchannel print head 12, fabricated for example from a silicon wafer using standard microfabrication techniques. The number of microchannels 42 required depends upon the desired resolution and the dimensions of the print head.

There are a number of methods known in the art suitable for forming the microchannels, including dry etching, wet etching, cutting, ion milling, laser ablation, etc. The channel width and wall thickness need not have the same dimensions. The wall thickness can be altered, independently from the channel width, to accommodate the desired printer resolution. The walls 40 may be provided with an anti-static layer such as indium tin oxide or doped polysilicon to prevent static build-up on the developer particles due to the developer rubbing against the channel walls as it moves through the channels.

Figure 4:
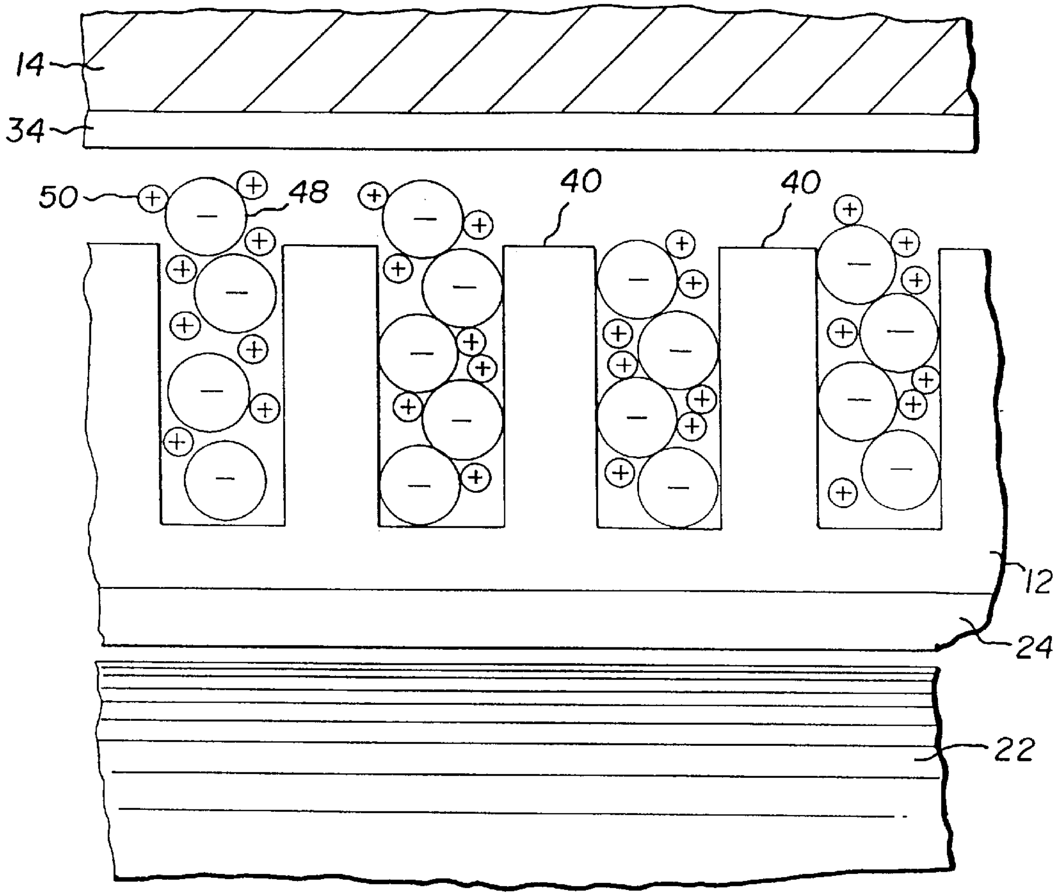
FIG. 4 is a partial cross sectional showing the microchannel print head mounted on the stationary shell of a magnetic brush.
Figure 5:
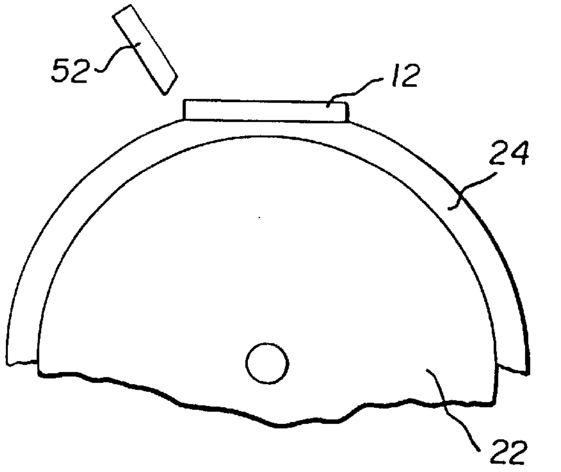
FIG. 5 is a partial side view of electrographic apparatus showing a skive for leveling the developer at the print head.

FIGS. 4 and 5 show the microchannel print head 12 mounted on the stationary shell 24 of magnetic brush 10. The print head 12, made from a rigid material such as silicon is mounted on a flat that has been machined on the shell of the magnetic brush. Other rigid materials such as plastics, thermoplastics, photoresists, etc may be used to manufacture the print head. In a line printer, the print head is at least as wide as the receiver and the row of microchannels extends the entire width of the receiver. Alternatively, a print head that is less than the width of the receiver may be mounted on a carriage and moved across the width of the receiver as is known in the ink jet and dot matrix printer art. In FIG. 4, a dual-component developer having negatively charged magnetic carrier particles 48 and positively charged toner particles 50 is shown flowing through the channels. The print head of the present invention may also be advantageously employed with a single-component magnetic developer such as the one described in the Kotz article noted previously.

Alternatively, a dual component magnetic developer with the magnetic carrier positively charged and the insulating toner negatively charged may be employed. Using such a developer, when a negative potential is applied to the transfer electrode 46 at the bottom of the channel, the triboelectric force holding the negatively charged toner to the positively charged carrier particle is overcome causing the toner to leave the carrier and transfer to the paper receiver 34. An opposite charge is induced in the paper drum 14 holding the toner particle to the paper. The amount of toner transferred to the paper 34 is proportional to the potential applied to the transfer electrode 46. Toner is transferred when a chain of developer particles 28 contacts the transfer electrode 46. No toner transfer occurs for developer chains not in contact with the transfer electrode 46.

At the transfer electrode 46, the height of the developer in the channel is preferably about the same or greater than the height of the walls 40. It is also possible to print with the developer height less than the microchannel wall height by employing the technique known as projection development to cause the toner particles to transit a gap between the print head and the receiver. As shown in FIG. 5, the developer height can be controlled with the use of a skive 52 located at the entrance to the print head 12. Both magnetic and non-magnetic leveling skives are known in the art for providing an effective means for controlling developer nap height. Although it is preferable to place the skive near the entrance of the microchannels, its exact placement is not critical.

Figure 6:
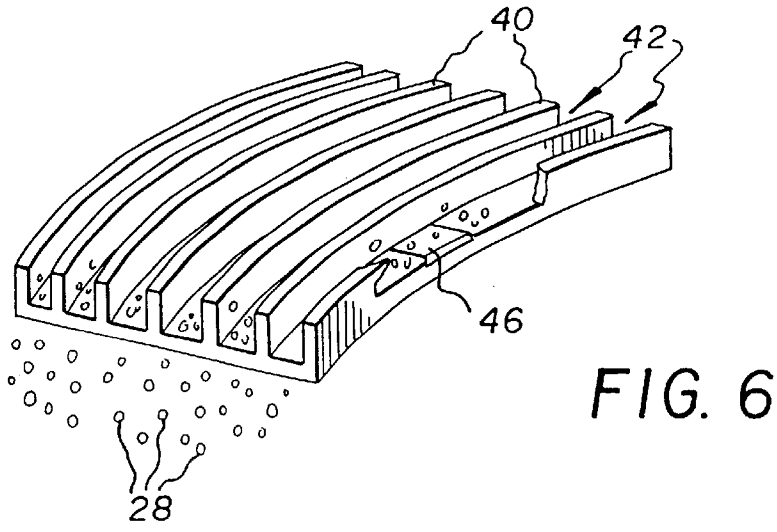
FIG. 6 is a partial perspective view showing a curved microchannel print head.

FIG. 6 shows a curved microchannel print head 12. The curved print head 12 can be made from flexible material such as photoresists, solder mask, etc. The print head 12 can be mounted on the stationary shell 24 by shaping the head to the shell contour and attaching the print head to the shell, for example, by an adhesive. Alternatively, the curved print head 12 may be made from a non-flexible material such as a ceramic material that is formed with the curved shape and cured to have the same curvature as the stationary shell 24.

Also shown in FIG. 6 are developer particles 28 flowing in the microchannels in response to the rotating magnetic core 22. Prior to reaching the microchannels 42, the developer 28 uniformly spreads out across the shell. As the developer enters the microchannels 42, it is confined to move in one or another of the channels and, upon reaching the transfer electrode 46 located in the channel, can be selectively transferred to a receiver sheet. The transfer electrodes 46 may be placed anywhere inside of the channel.

Figure 7:
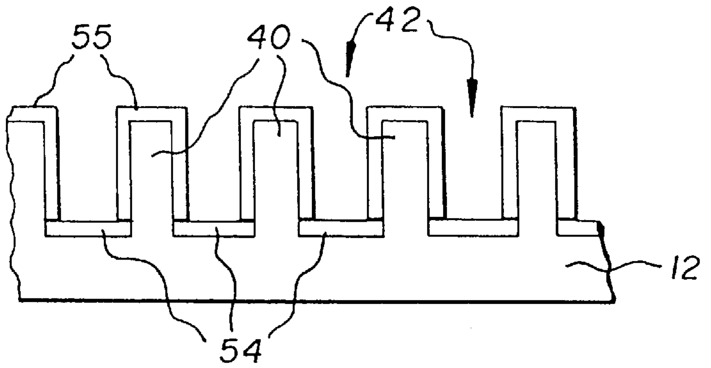
FIG. 7 is a partial cross sectional view of a microchannel print head having magnetic permeable strips on the bottom of the channels and an anti-abrasion layer on the channel walls.

As shown in FIG. 7 strips of magnetic permeable material 54 may be provided on the bottom of the channels to further confine the magnetic developer to the channels, thereby further reducing channel crosstalk. The magnetic permeable strips 54 may also be located external to the microchannels to pre-form developer ridges which aid in the developer flow as it enters the channels. Such external magnetic permeable strips can be used as an alternative to or in combination with the other features described below to assist in the developer flow as it enters the microchannels. The magnetic strips 54 are electrically insulated from the transfer electrodes 46. Alternatively the magnetic strips may function as both the transfer electrodes and the conductors to the transfer electrodes by providing a dielectric covering over the strips with a window in the dielectric at the location of the transfer electrode.

The magnetic carrier particles are made of ferrites which can be very abrasive. Since the receiver sheet is closely spaced to the tops of the channel walls 40, developer particles may become entrained between the channel tops and the receiver sheet and abrade the tops of the channel walls. To address this problem, an anti-abrasion layer 55 such as silicon nitride or silicon carbide may be formed on the tops and/or on the sides of the channel walls 40 to prevent abrasion from the developer particles. A layer of partially conductive diamond-like carbon may provide both antistatic and anti-abrasion properties.

Figure 8:
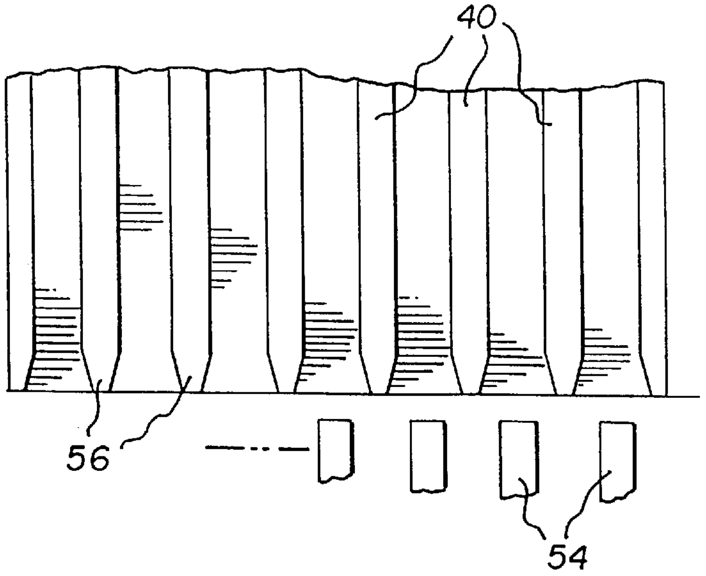
FIG. 8 is a partial top view of the microchannel print head having tapered entrances to the microchannels.

As shown in FIG. 8 the ends 56 of the walls 40 at the entrance to the microchannels may be tapered to "funnel" the developer into the channels. The tapered channels improve the developer flow into the channels by providing a gradual entrance to the channel. In addition, the magnetic permeable strips 54 may be provided external to the tapered microchannels to pre-form developer ridges that will aid in the developer flow as it enters the tapered channels.

Figure 9:
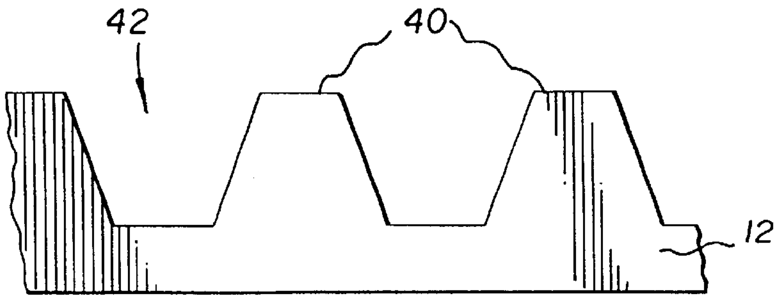
FIG. 9 is a partial cross sectional view of a microchannel print head having outwardly sloping channel walls to improve toner flow.
Figure 10:
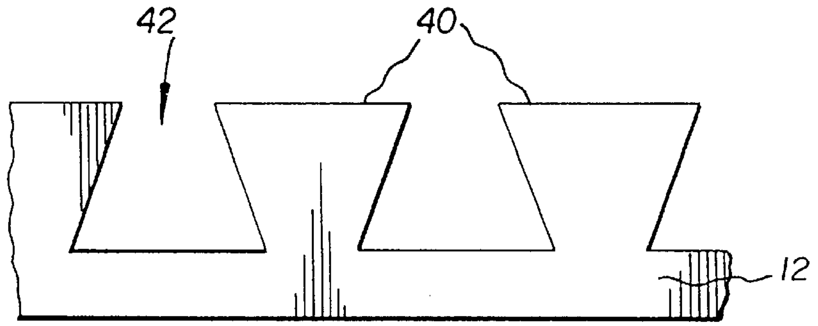
FIG. 10 is a partial cross sectional view of a microchannel print head having inwardly sloping channel walls to improve resolution.

As shown in FIG. 9, the channel walls 40 may be sloped so the channels 42 are wider at the top than at the bottom to improve developer flow in the channels. The channel walls may have a vertical portion at the bottom of the channel and slope near the top. The top of the channel wall may diminish in width sufficiently to define a knife edge. The rate of slope may continuously change so that the sides of the walls are curved from top to bottom. Alternatively, as shown in FIG. 10, the channel walls 40 may be oppositely sloped to improve resolution of the print head.

Figure 11:
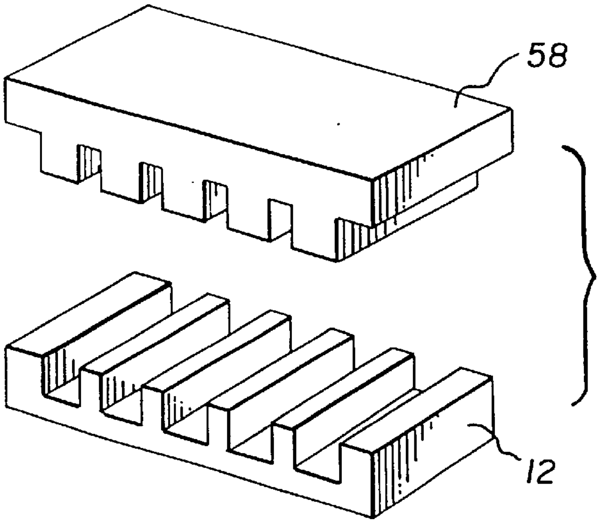
FIG. 11 is a schematic diagram illustrating the production of a microchannel print head by stamping from a master.

As shown in FIG. 11, the print head 12 may be formed by stamping from a master 58 produced for example by laser machining, to produce a microchannel print head 12. Stamping from a master can be used to form a print head from flexible materials that may be bent to conform to the cylindrical shell 24 of the magnetic brush 10 or may be used to form a print head using ceramic material that can be curved or planar.

Figure 12:
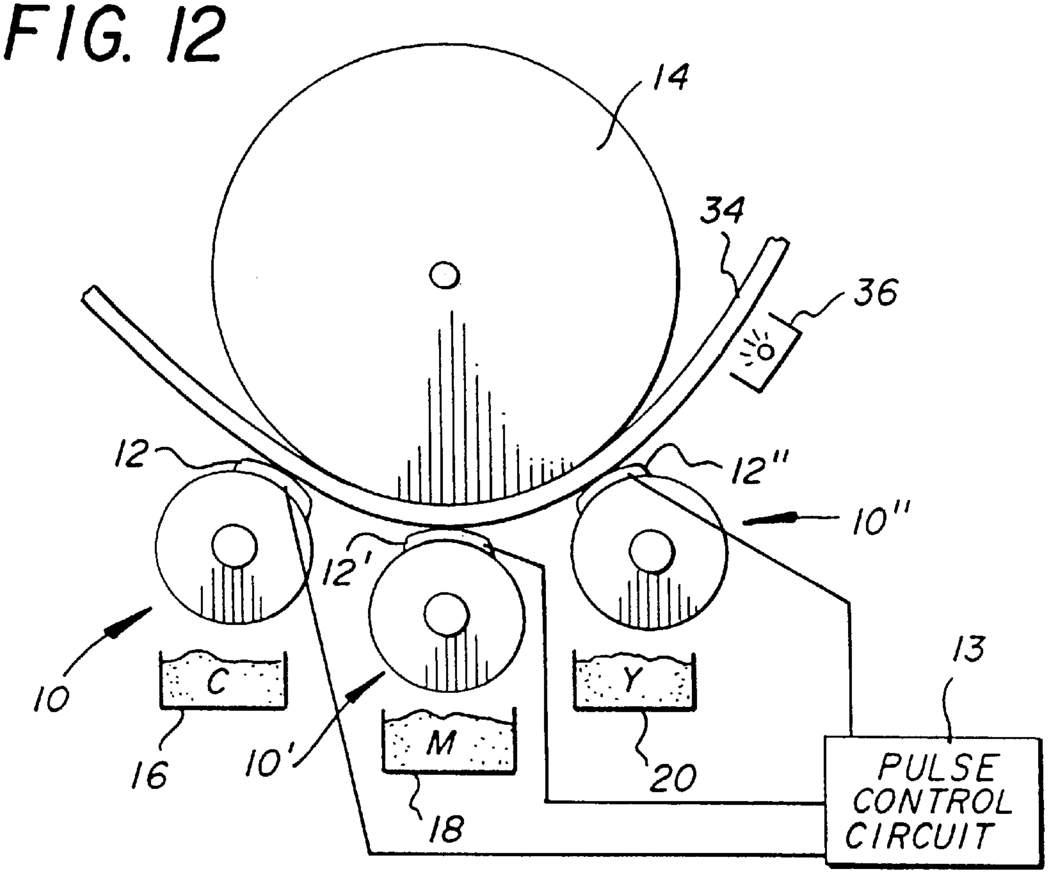
FIG. 12 is a schematic diagram illustrating an alternative embodiment of an electrographic color printer employing a microchannel print head according to the present invention.

Referring now to FIG. 12, an alternative embodiment of an electrographic color printer according to the present invention will be described. In this embodiment, three magnetic brushes 10, 10' and 10" having respective print heads 12, 12' and 12" are provided, as are three developer supplies 16, 18 and 20 having three differently colored toners (e.g. cyan, magenta and yellow). The three magnetic brush and print head assemblies are located with respect to the receiver 34 so that they can simultaneously deposit toner on the receiver 34. The pulse control circuit 13 applies control pulses to all three transfer electrode arrays simultaneously with a suitable delay between the respective arrays to compensate for their displacement along the receiver. This arrangement trades off higher equipment complexity and cost for higher speed of operation, since all three color components are printed simultaneously.

Figure 13:
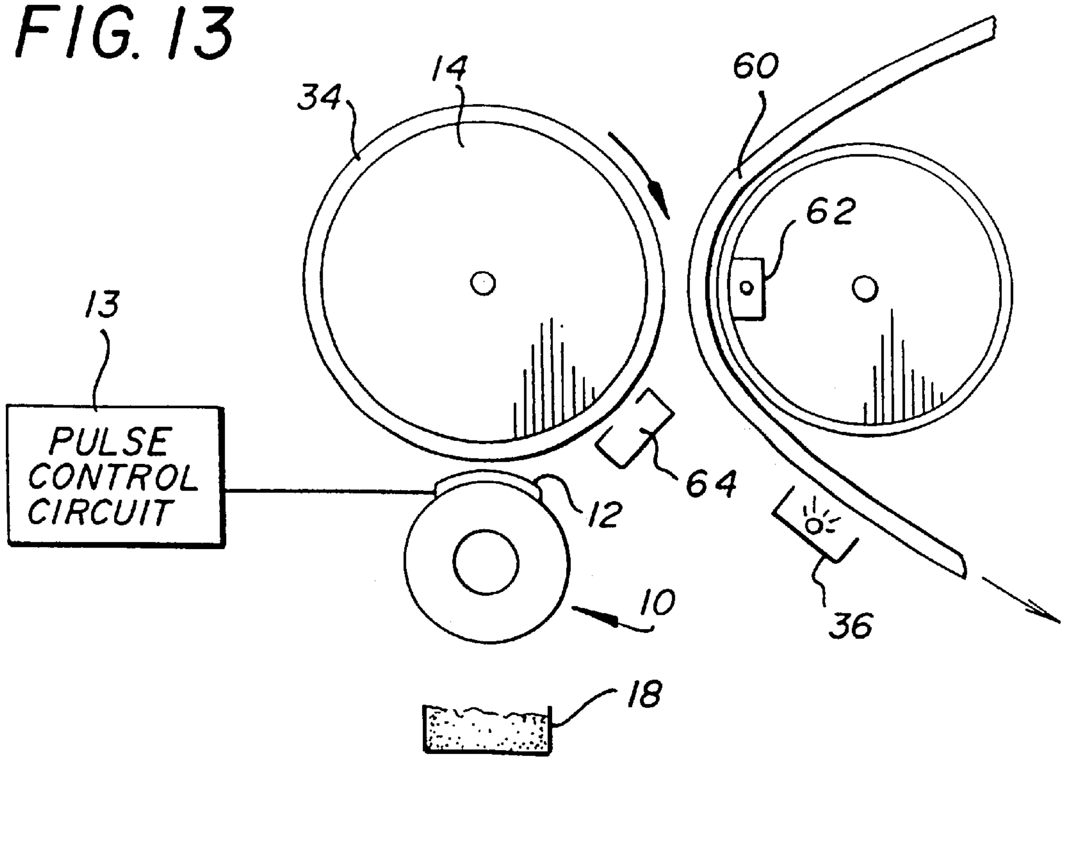
FIG. 13 is a schematic diagram illustrating a further alternative embodiment of an electrographic color printer employing the microchannel print head of the present invention.

A further alternative embodiment of the present invention is shown schematically in FIG. 13, where the image is formed first on a receiver 34 that is permanently attached to receiver electrode 14. The image is then transferred to a second receiver 60, such as plain paper, at a transfer station 62. Since plain paper does not possess as high a resistivity and dielectric constant as would be desirable, this arrangement allows the properties of the first receiver 34 to be optimized for effective imagewise transfer of toner at the recording region 32. Toner transfer stations such as station 62 are well known in the electrophotograhic arts and will not be described in detail herein. A cleaning station 64 of conventional construction may be provided to remove any trace of toner left on the receiver 34. The fusing station 36 is located as shown to fuse the image to the second receiver 60.

Figure 14:
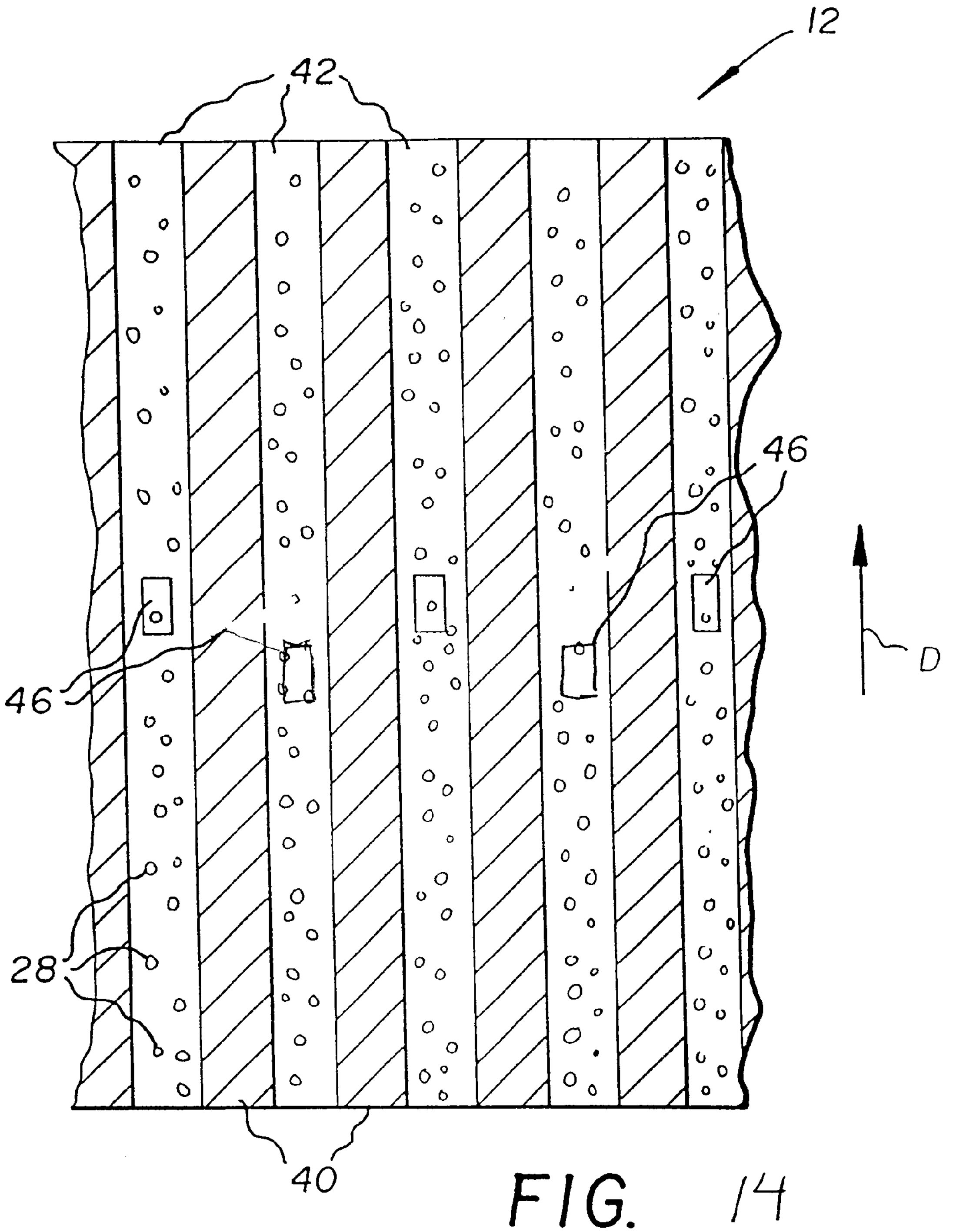
FIG. 14 is a partial top view of an alternative embodiment of the print head of the present invention, having staggered electrodes.

Referring to FIG. 14, according to an alternative embodiment of the present invention, the transfer electrodes 46 in the microchannels 42 may be staggered to further reduce crosstalk between the channels.

The invention has been described with reference to a preferred embodiment. However, it will he appreciated that variations and modifications can be effected by a person of ordinary skill in the art without departing from the scope of the invention.

PARTS LIST

10 magnetic brush
12 microchannel print head
13 pulse control circuit
14 receiver electrode
15 stepper motor
16 developer supply (cyan)
18 developer supply (magenta)
20 developer supply (yellow)
22 rotatable magnetic core
24 stationary outer shell
25 magnet sectors
26 sump
28 developer
30 magnetic feed roller
32 recording region
34 receiver
36 fusing station
38 lip on magnetic brush shell
40 microchannel walls
42 microchannels
46 transfer electrode
48 magnetic carrier particle
50 toner particle
52 skive
54 strip of magnetically permeable material
55 anti-abrasion layer
56 ends of channel walls
58 stamping master
60 second receiver
62 transfer station
64 cleaning station

What is claimed is:

1. Electrographic printing apparatus for forming a toner image on a recording medium, comprising:

a) a magnetic brush having a rotatable magnetic core and a stationary outer shell;

b) a developer supply for supplying a magnetic developer powder to the magnetic brush;

c) a print head on the outer shell, the print head defining an array of microchannels for forming a plurality of parallel lines of developer in the microchannels, the microchannels being at least 10 times longer and at least twice as deep as they are wide and including means for selectively transferring developer from the lines to a receiver; and d) a receiver electrode arranged in spaced relation to the array of microchannels to define a recording region through which the receiver can be moved.

2. The electrographic printing apparatus claimed in claim 1, wherein the print head comprises a nonflexible substrate having microchannel walls formed from photoimageable polymer.

3. The electrographic printing apparatus claimed in claim 1, wherein the developer is a dual-component developer.

4. The electrographic printing apparatus claimed in claim 1, further comprising strips of magnetically permeable material located in the microchannels.

5. The electrographic printing apparatus claimed in claim 1, wherein the print head includes a silicon substrate, and the means for selectively transferring developer are transfer electrodes located in the microchannels.

6. The electrographic printing apparatus claimed in claim 5, wherein the transfer electrodes are gold.

7. The electrographic printing apparatus claimed in claim 5, further comprising a circuit for selectively applying charge to the transfer electrodes, the circuit being integrated into the silicon substrate.

8. The electrographic printing apparatus claimed in claim 1, further comprising a skive for leveling the developer on the outer shell.

9. The electrographic printing apparatus claimed in claim 1, wherein the microchannels are tapered to funnel the developer into the channels.

10. The electrographic printing apparatus claimed in claim 1, wherein the microchannels include an anti-abrasion layer on the sides and tops of the walls defining the channels.

11. The electrographic printing apparatus claimed in claim 1, wherein the channels are narrower at the top than at the bottom to improve resolution.

12. The electrographic printing apparatus claimed in claim 1, wherein the channels are narrower at the bottom than at the top to improve developer flow.

13. The electrographic printing apparatus claimed in claim 1, wherein the microchannels include an antistatic layer on the sides and tops of the walls defining the channels.

14. An electrographic printing method, comprising the steps of:

a) supplying a magnetic developer to a print head;

b) confining the developer at the print head with an array of microchannels to form a plurality of parallel lines of developer in the microchannels, the microchannels being at least 10 times longer and at least twice as deep as they are wide; and c) selectively transferring developer in an imagewise manner from the lines to a receiver.

15. The electrographic printing method claimed in claim 14, wherein the microchannels are formed on a silicon substrate by integrated circuit manufacturing techniques.

16. The electrographic printing method claimed in claim 14, wherein the developer is a dual-component developer.

17. The electrographic printing method claimed in claim 14, further including the step of further confining the developer with an array of magnetically permeable strips.

18. The electrographic printing method claimed in claim 17, wherein the magnetically permeable strips are located in the microchannels.

19. The electrographic printing method claimed in claim 17, wherein the magnetically permeable strips are located at and aligned with entrances to the microchannels.

20. The electrographic printing method claimed in claim 14, wherein the microchannels are formed by stamping.

21. The electrographic printing apparatus claimed in claim 14, further comprising the step of leveling the developer with a skive prior to providing it to the print head.

22. A print head for an electrographic printer of the type having a magnetic brush for transporting magnetic developer to a recording region and a receiver for receiving an imagewise pattern of a component of the developer at the recording region, comprising:

a) a substrate defining a plurality of parallel microchannels for confining the developer to flow in the microchannels, the microchannels being at least 10 times longer and at least twice as deep as they are wide; and b) a corresponding plurality of selectively addressable transfer electrodes located at the bottom of each microchannel for selectively transferring the component of the developer to the receiver from the microchannel.

23. The print head claimed in claim 22, wherein the substrate is silicon.

24. The print head claimed in claim 22, further comprising strips of magnetically permeable material located in the microchannels.

25. The print head claimed in claim 22, further comprising strips of magnetically permeable material aligned with the entrances to the microchannels.

26. The print head claimed in claim 23, wherein the transfer electrodes are integrated into the silicon substrate.

27. The print head claimed in claim 23, further comprising circuitry for selectively applying charge to the transfer electrodes, the circuitry being integrated into the silicon substrate.

28. The print head claimed in claim 22, wherein the end of the microchannels are tapered to funnel developer into the microchannels.

29. The print head claimed in claim 22, further comprising an antiabrasion layer on a surface of the print head.

30. The print head claimed in claim 22, wherein the microchannels are narrower at the top than at the bottom to improve resolution.

31. The print head claimed in claim 22, wherein the microchannels are narrower at the bottom than at the top to improve developer flow in the channels.

32. The electrographic printing apparatus claimed in claim 1, wherein the print head comprises a flexible substrate having microchannel walls formed from photoimageable polymer.

33. Electrographic printing apparatus for forming a toner image on a recording medium, comprising:

a) a magnetic brush having a magnetic core and an outer shell;

b) a developer supply for supplying a magnetic developer powder to the magnetic brush;

c) a print head adjacent the outer shell, the print head defining an array of microchannels for forming a plurality of parallel lines of developer in the microchannels, the microchannels being at least 10 times longer and at least twice as deep as they are wide, and including means for selectively transferring developer from the lines to a receiver; and d) a receiver electrode arranged in spaced relation to the array of microchannels to define a recording region through which the receiver can be moved.

34. The electrographic printing apparatus claimed in claim 5, wherein the transfer electrodes are staggered.

35. The print head claimed in claim 22, wherein the transfer electrodes are staggered.

36. The electrographic printing apparatus claimed in claim 33, wherein the means for selectively transferring developer are transfer electrodes located in the microchannels.

37. The electrographic printing apparatus claimed in claim 36, wherein the transfer electrodes are staggered.

* * * * *